(12) United States Patent
Walsh

(10) Patent No.: US 6,321,738 B1
(45) Date of Patent: Nov. 27, 2001

(54) DIAMOND SAW BLADE

(75) Inventor: Thomas K. Walsh, Avon Lake, OH (US)

(73) Assignee: Diamond Products Joint Venture, Elyria, OH (US)

( * ) Notice: Subject to any disclaimer, the term of this patent is extended or adjusted under 35 U.S.C. 154(b) by 0 days.

(21) Appl. No.: 09/143,319

(22) Filed: Aug. 28, 1998

(51) Int. Cl.$^7$ .................................................. B28D 1/04
(52) U.S. Cl. .................................................. 125/15; 83/676
(58) Field of Search ........................... 83/676, 835, 855; 30/347; 125/15; 451/542, 544, 546, 549, 6

(56) References Cited

U.S. PATENT DOCUMENTS

| | | | | |
|---|---|---|---|---|
| 189,237 | * | 4/1877 | Lapham | 30/347 |
| 223,103 | * | 12/1879 | Berstler | 83/676 |
| 331,338 | * | 12/1885 | Squire | 30/347 |
| 747,260 | * | 12/1903 | Steltz | 30/347 |
| 1,334,112 | * | 3/1920 | Myers | 30/347 |
| 3,049,843 | * | 8/1962 | Christensen | 125/15 |
| 3,128,755 | * | 4/1964 | Benson | 125/15 |
| 3,338,230 | * | 8/1967 | Linbald | 125/15 |
| 4,267,814 | * | 5/1981 | Benson et al. | 125/15 |
| 4,345,579 | * | 8/1982 | Eichenlaub et al. | 125/15 |
| 4,472,880 | * | 9/1984 | Johansson | 30/347 |
| 4,550,708 | * | 11/1985 | Roemmele et al. | 125/15 |
| 4,583,515 | * | 4/1986 | Ballenger | 125/15 |
| 4,705,017 | * | 11/1987 | Lewis | 125/15 |
| 4,854,295 | * | 8/1989 | Sakarcan | 125/15 |
| 5,078,035 | | 1/1992 | Moller et al. | 83/522.12 |
| 5,218,949 | * | 6/1993 | Tomlinson et al. | 125/15 |
| 5,471,970 | * | 12/1995 | Sakarcan | 125/15 |

FOREIGN PATENT DOCUMENTS

WO9611093   4/1996   (WO) .

OTHER PUBLICATIONS

Promotional brochure dated Jan. 1996 for Core Cut.
Promotional brochure entitled "Dry Cutting Products" dated Apr. 1995.
Promotional brochure entitled "Wet Diamond Blades" dated Apr. 1994.

* cited by examiner

Primary Examiner—Kenneth E. Peterson
Assistant Examiner—Stephen Choi
(74) Attorney, Agent, or Firm—Rankin, Hill, Porter & Clark LLP

(57) ABSTRACT

The invention provides a new and improved diamond saw blade for use in cleaning the joints commonly found between concrete sections or slabs. The diamond cutting blade designed in accordance with the present invention provides a thin metal disk with a plurality of abrasive segments secured to the circumferential edge, the blade being adapted for rotation about an axis of rotation. The segments are symmetrically spaced about portions of the periphery of the disk in close end-to-end alignment with one another. A plurality of large elongated openings or gullets are formed in the disk symmetrically spaced in an annular zone located along the periphery of the blade. The gullets occupy at least 30%, and preferably at lest 40% of the outer periphery or circumference of the blade. With this arrangement, the gullets allow the blade to efficiently remove sealant from the joints of concrete.

1 Claim, 1 Drawing Sheet

DIAMOND SAW BLADE

FIELD OF THE INVENTION

This invention relates generally to cutting blades capable of rotation at relatively high speeds, and especially to such blades formed of a thin metal disk with a plurality of diamond abrasive segments secured to the periphery. More particularly, the invention relates to improved diamond saw blades for use in cleaning the joints that are commonly disposed or formed between slabs or sections of concrete.

BACKGROUND OF THE INVENTION

Abrasive diamond cutting saw blades for use in cutting concrete, brick, block, stone, and various other materials are well-known in the prior art. Generally, such blades comprise a metal disk or core having abrasive segments mounted along the entire periphery of the core. The abrasive segments are usually welded to the periphery of the metal disk, and they are typically composed of diamond particles and other abrasive material together with a bonding agent.

It has become common practice to provide slots in the outer marginal portion of the metal disk at a location generally between the adjacent segments, and also slots between adjacent abrasive segments. These slots in the disk extend inward from the periphery of the disk and serve to provide a degree of flexibility to the metal whereby distortion due to heating and the welding operation is reduced. Also, the slots help to maintain the disk true in use by preventing permanent distortion due to temporary deflection.

Cutting blades of this type are made in various sizes depending upon their intended use, but in all cases, they are rotated at high peripheral speeds. The blades are usually from 6" to 24" in diameter and from about 0.110" to 0.13" in thickness. Their operating speed is generally from about 6,000 to about 14,000 surface feet per minute, and the slots between cutting segments generally comprise in total much less than about 5% of the outer circumference or periphery of the blade.

Adjacent sections or slabs of concrete are commonly provided with slots or openings that are commonly referred to as expansion joints. These joints allow the concrete to expand at elevated temperatures, thereby helping to prevent damage to adjoining or abutting slabs. In order to prevent water from entering the joints or getting under the slabs, such joints are commonly filled or sealed with a flexible polymeric sealant, rubber or grout.

Over time, it can become necessary to remove and replace the sealant in the joints. More particularly, over time the sealant can fail to perform its function, because it cracks, becomes brittle, dries out, etc. Removal of the old sealant has generally been accomplished in two ways. One way is to attempt to remove the sealant by hand using putty knives, scrapers, etc. However, this is a very time-consuming task. A second approach is to utilize a conventional diamond saw blade, and attempt to cut the old sealant out of the joint using the blade. Unfortunately, this approach can create a bit of a mess, with the sealant sticking all over the blade, and the blade failing to sufficiently remove the sealant from the joint.

The construction of the present invention reduces the difficulties indicated above and affords other features and advantages heretofore not obtainable.

SUMMARY OF THE INVENTION

The present invention provides a new and improved diamond saw blade for use in cleaning the joints commonly found between concrete sections or slabs. The cutting blade designed in accordance with the present invention provides a thin metal disk with a plurality of abrasive segments secured to the circumferential edge, the blade being adapted for rotation about an axis of rotation. The segments are symmetrically spaced about portions of the periphery of the disk in close end-to-end alignment with one another with a slot preferably provided between each of the segments. A plurality of large elongated openings or gullets are formed in the disk, symmetrically spaced in an annular zone located along the periphery of the blade. The gullets occupy at least 30%, and preferably at least 40% of the outer periphery or circumference of the blade. With this arrangement, the blade is able to efficiently remove sealant from the joints of concrete, thereby avoiding the difficulties commonly experienced when utilizing a conventional diamond saw blade.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DESCRIPTION OF THE PREFERRED EMBODIMENT

Figure 1:
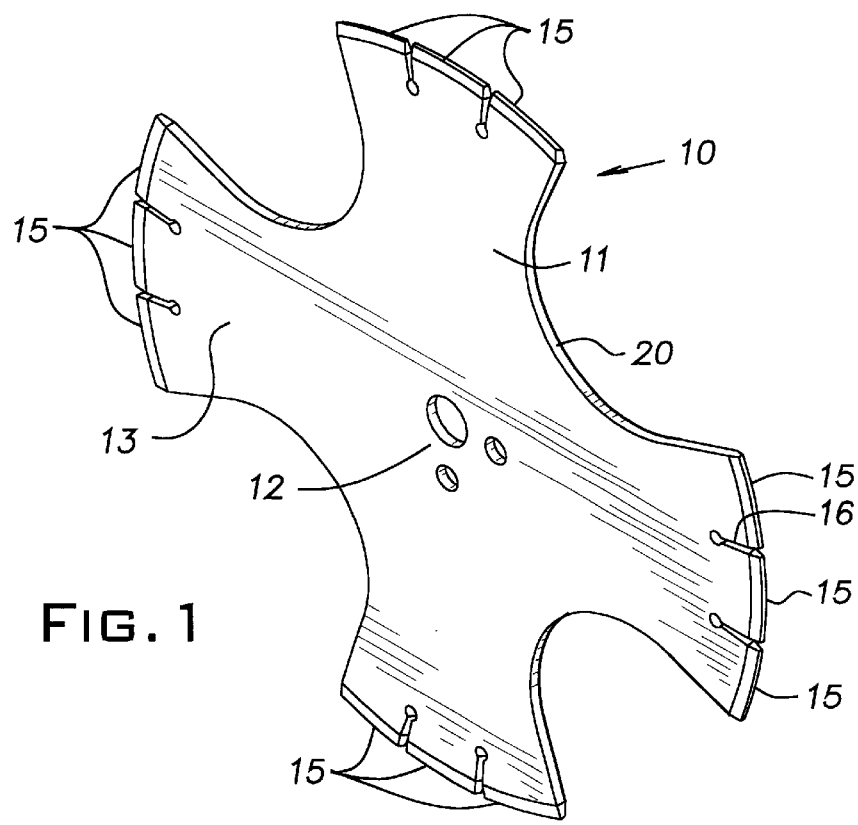
FIG. 1 is a perspective view of a diamond cutting saw blade formed in accordance with the invention.
Figure 2:
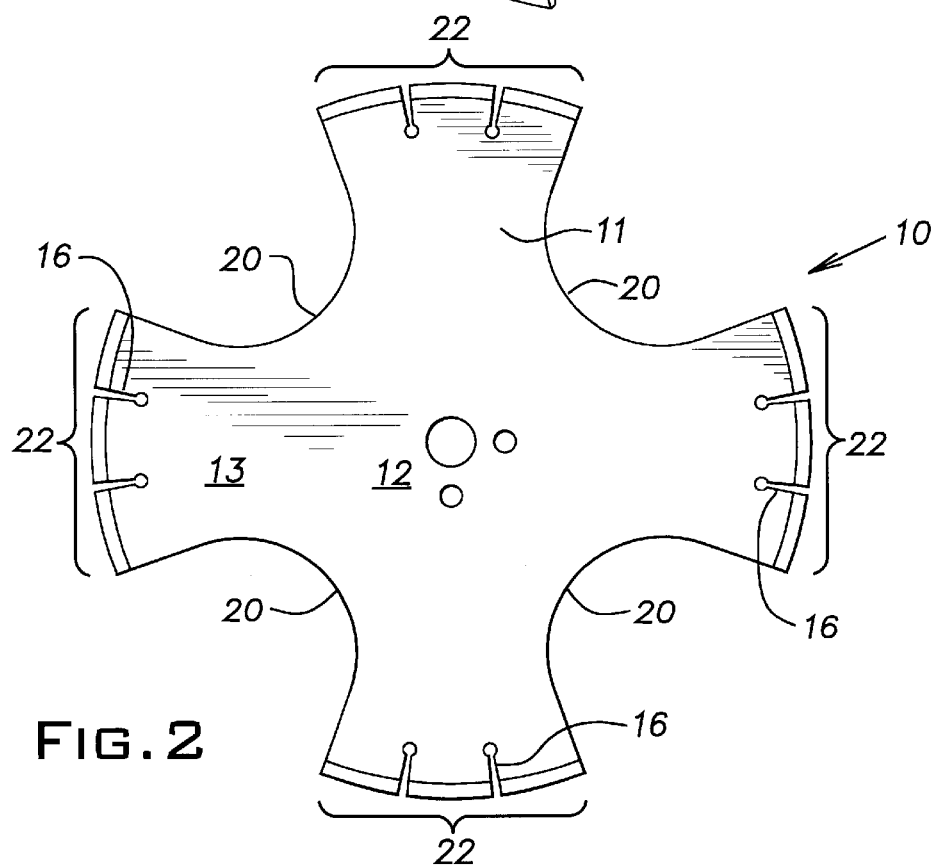
FIG. 2 is a side elevation view of the diamond saw blade of FIG. 1.

Referring to FIGS. 1 and 2, there is shown a saw blade 10 embodying the design of the present invention. The blade is adapted for use in efficiently cleaning sealants and similar materials that are commonly found in the joints or openings disposed between sections or slabs of concrete. The blade may be used in conjunction with a number of different drives that are capable of rotating the blade at a speed somewhere in excess of about 4,000 RPM. Such drive units may comprise, for example, electrical and gas powered hand saws, radial saws, table saws and large portable concrete saws.

The blade 10 is formed using a variety of conventional materials such as steel, diamond composite materials, carbide or the like. The blade 10 includes a metal disk 11 (preferably steel), comprising an inner drive portion 12 that surrounds the axis of rotation and an outer cutting portion 13 that includes a plurality of any one of a variety of abrasive elements or segments 15. The segments may be secured to the periphery of the disk 11 by means of welding, the segments being aligned end-to-end, preferably with a small space or slot 16 between them to accommodate relative lateral movement and/or expansion.

The segments 15 are somewhat wider than the thickness of the disk 11 to prevent jamming of the blade during service or use and to provide means for removal of any abraded stock. The cutting segments 15 are formed in a conventional manner using industrial diamonds. For example, segments may comprise powdered metals and a mixture of abrasive industrial diamond particles. After the segments 15 are formed, they are attached to the disk 11 in a conventional manner such as by welding or brazing, and preferably by laser welding.

The disk 11 is further provided with a plurality of large gullets or openings 20. The gullets 20 do not have continuous outer edges so that, as shown, they extend to the circumferential edge of the disk 11 and form somewhat half-round depressions or cutouts. The gullets 20 are located in a symmetrical pattern in an annular zone, the number of openings preferably corresponding to the number of cutting sections 22 formed between the gullets. The gullets 20, in addition to generating airflow for the cooling of the disk 11, serve to facilitate the efficient and essentially complete removal of the sealant materials from expansion joints.

Gullets 20 are formed along at least about 25%, and preferably at least 30% of the outer circumference of the blade 10. Gullets 20 are formed to a depth of at least about 25%, and preferably at least about 30%, of the radius of said disk 11. At least 2 of such gullets 20 are provided in the blade, and preferably, from about 3 to about 10 of such gullets are formed in the blade.

In addition to slots and gullets 20, it will be appreciated that slots or slits of a very minor width (not shown) may be formed in disk 11. Such slits are preferably formed in a conventional manner using a laser cutting technique of the type currently known in the art by which cutting energy can be highly concentrated resulting in minimal removal of material during the slit cutting operation. Such slits a width of from about 0.005" to about 0.020", and preferably a width of less than about 0.010". These types of slits are commonly utilized in cutting blades to facilitate lateral movement and flexibility of the blade.

While the invention has been shown and described with respect to specific embodiments thereof, this is for the purpose of illustration rather than limitation and other variations and modifications of the specific device herein shown and described will be apparent to those skilled in the art all within the intended spirit and scope of the invention. Accordingly, the patent is not to be limited in scope and effect to the specific embodiments herein shown and described, nor in any other way that is inconsistent with the extent to which the progress in the art has been advanced by the invention.

What is claimed is:

1. A diamond saw blade for use in cleaning joints formed in concrete comprising a metal disk having a radius, a periphery and a plurality of diamond abrasive cutting segments spaced about a portion of the periphery of the disk, and at least three gullets formed in the disk such that a plurality of separate cutting sections are formed along the periphery of the disk, the gullets comprise at least about 30% of the periphery of the disk and said gullets extend to a depth of at least about 30% of the radius of said disk.

* * * * *